United States Patent [19]
Sugino

[11] Patent Number: 4,656,562
[45] Date of Patent: Apr. 7, 1987

[54] OPTICAL INTEGRATOR MEANS FOR INTENSITY MODIFICATION OF GAUSSIAN BEAM

[75] Inventor: Paul S. Sugino, Santa Maria, Calif.

[73] Assignee: Santa Barbara Research Center, Goleta, Calif.

[21] Appl. No.: 776,189

[22] Filed: Sep. 13, 1985

[51] Int. Cl.⁴ .......................... F21V 5/02; G02B 5/04
[52] U.S. Cl. ..................................... 362/32; 362/235; 362/268; 362/339; 350/286
[58] Field of Search ............... 362/235, 236, 244, 246, 362/32, 339, 268, 26, 27, 326; 350/96.1, 96.28, 168, 286, 287

[56] References Cited

U.S. PATENT DOCUMENTS

| | | | |
|---|---|---|---|
| 1,326,014 | 12/1919 | Bailey | 362/268 |
| 3,535,507 | 10/1970 | Sugino | 362/235 |
| 3,670,260 | 6/1972 | Koesler et al. | 350/286 |
| 3,813,514 | 5/1974 | Canty | 362/32 |
| 4,399,358 | 8/1983 | Burkhardt et al. | 362/339 |

FOREIGN PATENT DOCUMENTS 1022806 12/1952 France ................................ 362/339

OTHER PUBLICATIONS

P. W. Rhodes et al., "Refractive Optical Systems for Irradiance Redistribution of Collimated Radiation: Their Design and Analysis", Applied Optics, vol. 19, No. 20, Oct. 15, 1980.

*Primary Examiner*—William A. Cuchlinski, Jr.
*Assistant Examiner*—D. M. Cox
*Attorney, Agent, or Firm*—Ronald L. Taylor; A. W. Karambelas

[57] ABSTRACT

Optical projection apparatus is disclosed for generating a planar light beam of substantially uniform intensity from a nonplanar multi-element light source projecting a beam having a generally Gaussian intensity distribution. In the preferred embodiment, an optical integrator rod having a faceted end face is used to essentially invert the cross-sectional intensity of the beam entering the entrance face so that when the beam leaves the exit face it has a generally uniform intensity. The body of the integrator rod serves to homogenize the nonplanar source into an exiting beam having substantially planar characteristics.

9 Claims, 6 Drawing Figures

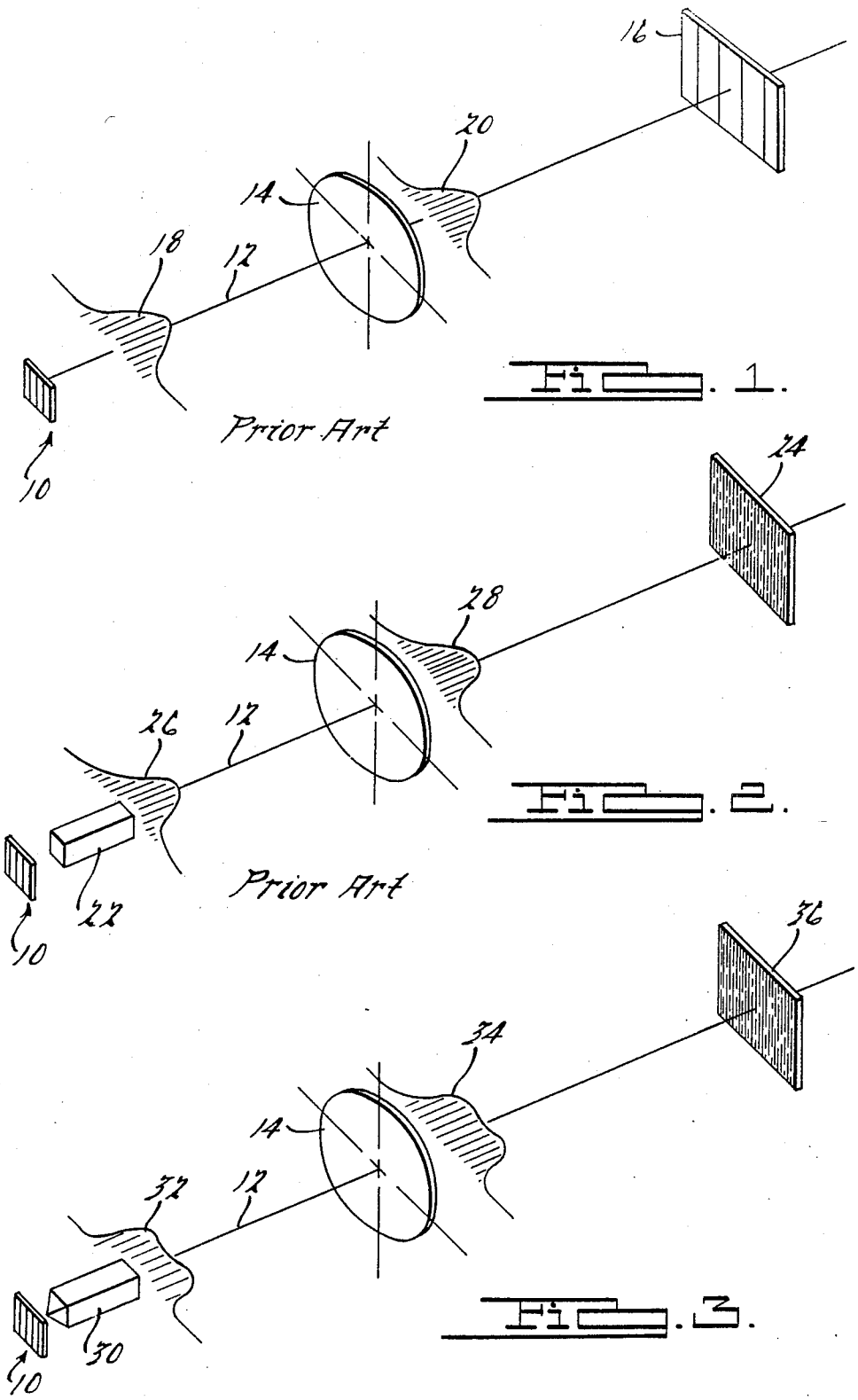

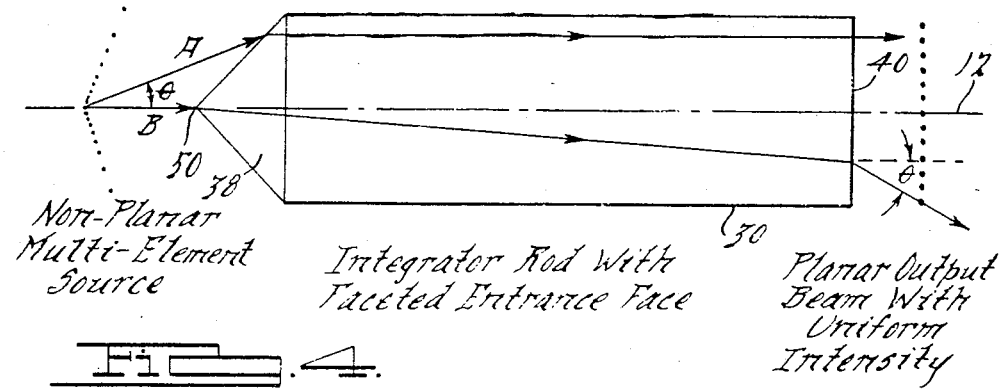
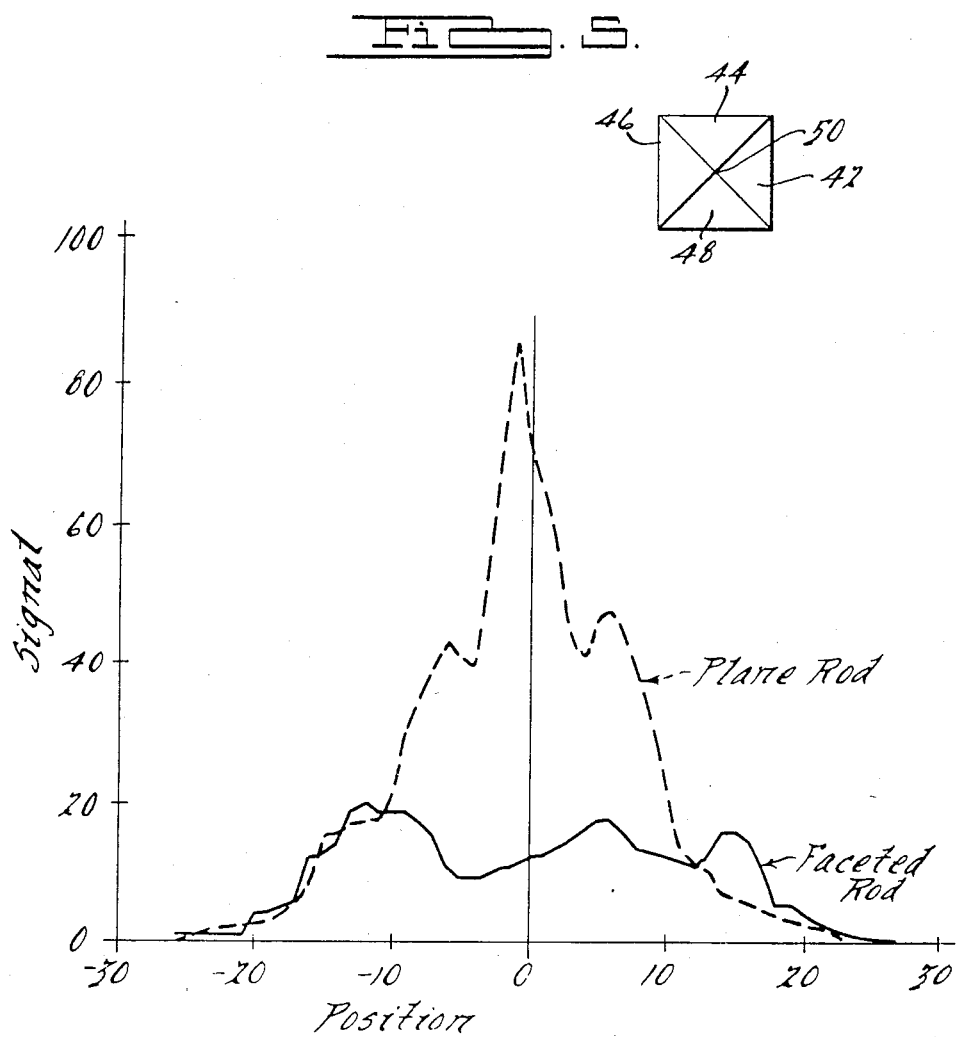

OPTICAL INTEGRATOR MEANS FOR INTENSITY MODIFICATION OF GAUSSIAN BEAM

BACKGROUND OF THE INVENTION

1. Field of the Invention

This invention relates to optical projection apparatus and, more particularly, to means for generating a light beam of substantially uniform intensity from a multi-element light source initially projecting a beam having a generally Gaussian intensity distribution.

2. Description of Related Art

A laser is a source of high intensity, coherent, monochromatic light that has a number of diverse applications. The laser beam is often generated from a nonplanar array of discrete, mutually spaced light sources such as commonly found in GaAs laser diode arrays. In most applications, it is desirable to convert the light from the nonplanar multi-element source into a substantially uniform flat or planar luminous source. U.S. Pat. No 3,535,507 to Sugino discloses one particularly advantageous method of accomplishing this objective. Briefly, this is accomplished by passing the light through an axially elongated optical duct comprising a body of optical material with totally reflecting side faces, as well as flat entrance and exit faces perpendicular to the optical axis. The body of optical material effectively integrates or homogenizes the discrete nonplanar light sources into a uniform planar beam.

While the above-mentioned patent teaches an advantageous method of generating a planar beam from a plurality of discrete nonplanar sources, the output beam still does not have a uniform distribution of light intensity across its diameter. The technical literature reports several problems that are associated with the non-uniform light intensity distribution of laser beams (see, e.g., P. W. Rhodes et al, "Refractive Optical Systems for Irradiance Redistribution of Collimated Radiation: Their Design and Analysis", *Applied Optics*, Vol. 19, No. 20, Oct. 15, 1980). The intensity of a laser beam generally follows a Gaussian distribution, i.e., the beam is more intense along the central optical axis. The high central irradiation is a potential eye hazard when using high powered lasers unless suitable precautions are taken. Still other problems associated with the Gaussian distribution is that it dramatically reduces the optical efficiency in optics such as telescopes with central obscuration.

In an attempt to redistribute the radiation of laser beams, the authors of the above-noted article disclose the use of aspheric refracting elements to normalize the output of the beam to a uniform energy distribution. Some of the drawbacks with this approach include the requirement for at least two additional lenses in the optical system thereby increasing cost, set up time, and other problems that are appreciated by the skilled practitioner.

SUMMARY OF THE INVENTION

According to the preferred embodiment of the present invention, optical apparatus is disclosed for generating a planar light beam of substantially uniform intensity from a multi-element source in a simple, yet reliable manner. A rod of optical transmitting material is disposed coaxially with the beam projecting from the multi-element source. Preferably, the rod has a substantially rectangular cross section throughout its length between an entrance face and an exit face thereof. The body of the rod is adapted to provide a substantially planar source of light at the exit face thereby serving to integrate or homogenize the light from the discrete, multi-element light sources. The entrance and exit faces also have different geometric configurations which are chosen to effectively invert the cross-sectional intensity of the beam entering the entrance face, thereby providing the beam with a generally uniform intensity as it leaves the exit face of the rod. In the preferred embodiment, the entrance face of the rod is faceted to thereby redistribute light rays from the high intensity central area of the entrance beam towards the outer circumference of the exit face of the rod. In such manner, beam integration and intensity modification are all accomplished through the use of essentially one optical element.

BRIEF DESCRIPTION OF THE DRAWINGS

The various advantages of the present invention will become apparent to one skilled in the art upon reading the following specification and by reference to the drawings in which:

FIG. 1 is a pictorial view showing a first prior art optical system;

FIG. 2 is a pictorial view showing a second prior art optical system where the beam from the source has been optically integrated to provide a planar output beam;

FIG. 3 is a pictorial view of the optical system of the preferred embodiment of the present invention;

FIG. 4 is a side view of an integrator rod with a faceted entrance face made in accordance with the teachings of the present invention;

FIG. 5 is an end view of the faceted face of the rod; and

FIG. 6 is a graph comparing output beam intensity distributions of a conventional integrator rod and a rod with a faceted end according to the teachings of the present invention.

DESCRIPTION OF THE PREFERRED EMBODIMENT

The contribution to the art provided by way of the present invention can be most easily appreciated by reference to FIGS. 1 and 2 which schematically illustrate prior art optical systems and comparing them with FIG. 3 which illustrates the improvements of the present invention.

The present invention is particularly concerned with the modification of beams of light generated from a multi-element light source 10. Source 10 is typically comprised of a multi-diode array in which the individual diodes are packaged in either a planar or nonplanar configuration. Multi-diode sources are well known in the art and are typically used for generating high powered laser beams. One example of a typical light source is the multi-diode array disclosed in the abovementioned '507 patent to Sugino which is hereby incorporated by reference. For ease of illustration, the lines shown on source 10 in the drawings represent the light radiated from the individual elements, e.g., individual diodes in the array.

Source 10 projects a beam along an optical axis 12 through a suitable lens subsystem represented by lens 14 where it is projected onto a target 16. The projection of the raw source 10 unfortunately tends to lead to a target illumination which is non-uniform, i.e., each individual diode is imaged at the target plane in the case of a planar source. If the source 10 is a nonplanar source, i.e., three-dimensional, the target illumination also suffers form the defocus effects due to nonplanarity of the individual or discrete light sources making up the array. The intensity distribution of the projected beam at various points along the optical axis 12 is pictorially illustrated by energy profile curves 18 and 20. The light sources to which the invention pertains, such as laser diodes and arrays, have a high degree of coherency leading to a somewhat Gaussian distribution of intensity. In other words, the beam intensity is highly concentrated in the middle of the beam, with the intensity decreasing dramatically as one progresses towards the outer periphery of the beam.

In order to solve the far field target illumination problem noted above, the '507 patent to Sugino suggests the use of an integrator rod 22 shown in FIG. 2. Briefly, the integrator rod 22 serves to homogenize the light from the individual elements of source 10 and convert the discrete light into an essentially uniform, planar source for illuminating target 24. Consequently, target 24 is illuminated uniformly thereby reaping the known advantages of such illumination. Unfortunately, the integrator rod 22 used in the prior art approach does not affect the intensity distribution of the beam along the optical axis. In other words, the intensity distribution represented by energy profile curves 26 and 28 are substantially the same as that of energy profile curves 18 and 20 of FIG. 1 where the raw source is used to illuminate the target.

Turning now to FIG. 3, the present invention enables the user to obtain all of the advantages of the integrating function of the prior art rod 22, while at the same time eliminating the intensity distribution problem. Pursuant to the present invention, a rod 30 of optically transmitting material is provided with entrance and exit faces having different geometric configurations which are chosen to effectively invert the intensity of the beam from source 10 entering the entrance face thereby providing the beam with a generally uniform intensity distribution as it leaves the exit face. This so-called inversion process is illustrated schematically in FIG. 3 by way of energy profile curves 32 and 34. A comparison of the energy profile curves for the beams in FIGS. 1 and 2 with FIG. 3 graphically illustrates how the present invention serves to spread out the intensity distribution of the beam so that it is no longer concentrated in the central area of the beam. Consequently, not only is the target 36 illuminated with uniform, planar light, but the irradiance from the source 10 has been further modified so as to minimize the potential for eye hazards for those persons located in the general area of beam travel.

Various surface geometries for the exit and end faces of rod 30 can be employed in carrying out the teachings of this invention. With particular reference to FIG. 4, one skilled in the art can appreciate that there exists a surface curvature for the entrance face 38 of the rod which would: (1) make the marginal ray (A) leave the exit face 40 parallel to the optical axis 12; and (2) make the axial ray (B) leave the rod 30 at an angle $\theta$. By properly choosing the entrance and exit face geometries, the high intensity Gaussian radiation near the optical axis 12 is spread out towards the periphery of the beam. In other words, a small area in the center of the beam is distributed over a much larger annular zone. By way of a nonlimiting example, rod 30 has a faceted entrance face 38 defined by four triangular surfaces 42–48 which meet at apex 50 lying on the optical axis 12. The rod 30 can be made of Grade A fused quartz having polished sides. The body of rod 30 is rectangular in cross section approximately 0.04 inches per side. The angle of the facet faces with respect to the transverse axis is about 33 degrees.

It should be understood that while this invention has been described in connection with particular examples thereof, no limitation is intended thereby. For example, those skilled in the art will appreciate that the curvature for the faceted face of the rod 30 need not be flat as shown in the drawings and that, in fact, optimum theoretical inversion of the beam would be expected with faces having some curvature. The optimum curvature can be chosen by way of ray tracing procedures well known in the art. However, the four flat facet surfaces shown in the drawings have provided satisfactory results and is considerably easier to make. FIG. 6 compares the intensity distribution of an integrator rod of the type referred to by numeral 22 in FIG. 2 with the faceted rod of the type shown in FIGS. 3 and 4. Thus, it can be seen that this specific embodiment does serve to provide acceptable results in that it serves to substantially flatten out the intensity distribution of the beam.

Therefore, the scope of the present invention should not be judged in accordance with this specific example since other modifications will become apparent to the skilled practitioner upon a study of the specification, drawings and following claims.

What is claimed is:

1. In an optical projection apparatus having a multi-element source projecting a beam having a generally Gaussian intensity distribution along an optical axis towards a target plane, with the beam including a marginal ray and an axial ray, wherein the improvement comprises:

a rod of optically transmitting material disposed coaxially with the optical axis, means defining an entrance face and an exit face for the rod, said means including different geometric configurations for the entrance and exit faces, adapted for inverting the intensity of the beam entering the entrance face such that marginal rays of the beam leave the exit face substantially parallel to the optical axis and wherein axial rays are redistributed outwardly so as to diverge from the exit face thereby providing the beam with a generally uniform intensity as it leaves the exit face.

2. The improvement of claim 1 wherein the entrance face of the rod is faceted and the exit face is substantially planar.

3. The improvement of claim 2 wherein the entrance face is defined by four triangular shaped surfaces meeting at an apex disposed substantially coaxially with the optical axis.

4. Optical projection apparatus for generating a light beam of substantially uniform intensity from a multi-element, nonplanar source projecting a beam along an optical axis having a generally Gaussian intensity distribution, with the beam including a marginal ray and an axial ray, said apparatus comprising:

a rod of optically transmitting material having its length disposed coaxially with the beam projected from the source, said rod having a substantially rectangular cross-section throughout its length, means defining an entrance and exit face for the rod, said means including different geometrical configurations for the entrance and exit faces, adapted to invert the intensity of the beam entering the entrance face such that marginal rays of the beam leave the exit face substantially parallel to the optical axis and wherein axial rays are redistributed outwardly so as to diverge from the exit face thereby producing a beam at the exit face in the form of a plane source of forwardly directed light having a generally uniform intensity distribution.

5. The apparatus of claim 4 wherein the entrance face has faceted surfaces and the exit face is substantially planar.

6. The apparatus of claim 5 wherein the entrance face is defined by four triangular shaped surfaces of equal size meeting at an apex disposed along the optical axis, adapted to generally make a marginal ray from the source leave the exit face of the rod parallel to the optical axis and to make an axial aray from the source leave the exit face of the rod disposed toward the periphery of the exit face of the rod at an angle with respect to the optical axis.

7. The apparatus of claim 6 wherein said rod is constructed of a single piece of quartz material.

8. In an optical projection apparatus having a multi-element source projecting a beam having a generally Gaussian intensity distribution along an optical axis towards a target plane, wherein the improvement comprises:

a rod of optically transmitting material disposed coaxially with the optical axis; said rod having an entrance face defined by four triangularly-shaped surfaces meeting at an apex disposed substantially coaxially along the optical axis, and wherein said rod has an exit face of a different geometric configuration cooperating with the configuration of the entrance face to effectively invert the intensity of the beam entering the entrance face thereby providing the beam with a generally uniform intensity as it leaves the exit face.

9. Optical projection apparatus for generating a light beam of substantially uniform intensity from a multi-element, nonplanar source projecting a beam along an optical axis having a generally Gaussian intensity distribution, said apparatus comprising:

a rod of optically transmitting material having its length disposed coaxially with the beam projected from the source, said rod having a substantially rectangular cross-section throughout its length between an entrance face and an exit face, said entrance face being defined by four triangularly-shaped surface of equal size meeting at an apex disposed along the optical axis, and said entrance face being substantially planar whereby said configurations of said entrance and exit faces cooperate to generally make a marginal ray from the source leave the exit face of the rod parallel to the optical axis and to make an axial ray from the source leave the exit face of the rod disposed toward the periphery of the exit face of the rod at an angle with respect to the optical axis, thereby producing a beam at the exit face in the form of a plane source of forwardly-directed light having a generally uniform intensity distribution.

* * * * *